United States Patent

Hiok et al.

[19]

[11] Patent Number: 5,926,449
[45] Date of Patent: *Jul. 20, 1999

[54] PRE-CALIBRATION SYSTEM AND METHOD FOR CD-ROM DRIVE SPEED OPTIMIZATION

[75] Inventors: Tan Phuay Hiok; Leow Siew Kiat, both of Singapore, Singapore

[73] Assignee: Creative Technology Limited, Singapore, Singapore

[ * ] Notice: This patent issued on a continued prosecution application filed under 37 CFR 1.53(d), and is subject to the twenty year patent term provisions of 35 U.S.C. 154(a)(2).

[21] Appl. No.: 08/795,938

[22] Filed: Feb. 5, 1997

Related U.S. Application Data

[30]  Foreign Application Priority Data

Feb. 7, 1996 [SG] Singapore .......................... 9601118-4

[51] Int. Cl.⁶ ....................................................... G11B 7/00
[52] U.S. Cl. ................................................. 369/54; 369/50
[58] Field of Search .................................. 369/54, 50, 47, 369/48, 44.28; 360/73.03, 73.01, 73.08

[56] References Cited

U.S. PATENT DOCUMENTS

| | | | |
|---|---|---|---|
| 4,829,497 | 5/1989 | Sako et al. | 369/48 |
| 5,220,551 | 6/1993 | Tateishi et al. | 369/50 |
| 5,309,419 | 5/1994 | Koike | 369/54 |
| 5,453,972 | 9/1995 | Kancazawa et al. | 369/219 |
| 5,535,186 | 7/1996 | Ishizawa | 369/50 |
| 5,673,242 | 9/1997 | Lin | 369/50 |

*Primary Examiner*—Thang V. Tran
*Attorney, Agent, or Firm*—Lawrence Y. D. Ho

[57] ABSTRACT

A system and method for pre-calibrating a CD-ROM drive for each CD-ROM disc inserted into the drive for maximizing the drive's performance without degradation in data transmission. When a CD-ROM disc is inserted, the disc is rotated to its maximum speed. The system reads a predetermined data segment from the inner most region of the disc. If error is detected, then the speed is lowered until no errors are encountered. The error-free speed is then chosen as the operating speed for the disc. In another embodiment, the disc is separated into multiple zones. The system calibrates each of the zones for its particular maximum error-free speed, and selects the error-free speed as the operating speed for the zone.

13 Claims, 4 Drawing Sheets

PRE-CALIBRATION SYSTEM AND METHOD FOR CD-ROM DRIVE SPEED OPTIMIZATION

FIELD OF THE INVENTION

This invention relates to the field of CD ROM technology, and particularly to a pre-calibration system and method for optimizing the speed of a CD-ROM drive for each CD-ROM disc inserted into the drive such that the drive can be made to run at the highest speed which will not incur data transmission problems.

BACKGROUND OF THE INVENTION

In the CD-ROM industry, there is an ever-increasing competition to increase the rate at which the data can be transferred from a CD-ROM disc to a peripheral device (hereinafter the terms "speed" or "CD-ROM speed" or "data transmission speed" shall be used to denote the rate at which data is transferred, and should be distinguished from "rotational speed" which refers to the rate at which a CD-ROM disc rotates or spins in the disc drive). This is understandable since higher speed usually means less waiting time for the user. The earliest commercially available CD-ROM drive utilized a similar technology as that of an audio CD player and achieved a comparable speed (hereinafter referred to as single-speed or 1x). Soon thereafter, the industry introduced dual-speed or 2x drives, quad-speed or 4x drives, and currently the 8x drives.

In order to achieve the higher speeds, the drive must be able to spin the disc at correspondingly increased rotational speeds. So for instance, a 4x drive should be able to spin the CD-ROM disc about twice as fast as that of a 2x drive. With increased speeds (hence increased rotational speeds), however, the disc experiences increased vibration. This vibration, which increases exponentially with speed, is a serious problem which can significantly hinder the drive's performance. Intermittent data streaming, for example, is one such a problem where the drive is unable to read some of the data off the CD-ROM. This problem may make video applications inoperable, or may unduly slow down other applications due to extended error recovery time.

Furthermore, there may be other hardware problems or constraints which may degrade the performance of the CD-ROM drive. For instance, the drive motor may exceed its maximum rotational speed, or the drive may experience resonance. This is why although there currently exist 8x drives, the performance is quite poor as evidence by the negative review of the first 8x drive in an article from the 1995 December issue of *PC World* entitled "First 8x CD-ROM Drive Doesn't Live Up To Its Name."

Although some higher speeds can conceivably be achieved without compromising performance, this would require significant improvement in the current drives' hardware design, and would require extensive modification. In fact, to the best of the inventors' knowledge, no commercially available CD-ROM hardware currently exists which can consistently run a CD-ROM disc at 8x speed without experiencing significant performance problems.

Hence, for now, there is generally a compromise between speed and performance. So while higher speed is highly desirable and may be achieved using current CD-ROM technology, it is undesirable to degrade the integrity of the data transmission. On the other hand, while it is desirable to have error-free transmission, it is undesirable to operate the drive at a speed lower than its maximum potential.

The current CD-ROM drives do not operate at their maximum potential; they either suffer from poor data transmission due to excessive speed (or lower speed than that claimed due to increased error recovery time), or do not operate at the highest speed they are capable of running. The currently-available 8x drives (as alluded to above) are an example of CD-ROM drives which suffer from poor data transmission as a result of the drive being operated at its near-maximum speed. The currently-available 4x drives (actually also the 2x and 1x drives) are an example of drives which operate below their maximum speed.

The primary reason for this shortcoming is that the drives are only capable of operating at one speed even though higher speeds are possible at times without serious degradation in performance, provided that certain parameters are met. The current drives, however, lack the proper means to account for these parameters, and therefore, are relegated to either operating at a below-optimum speed to ensure consistent data transmission for all situations, or operating at an excessively high-speed which cannot be maintained continuously without encountering transmission errors.

Therefore, in light of these shortcomings, it would be highly desirable to have a method and apparatus for the optimization of the operating speeds for current-available CD-ROM drives to facilitate maximum performance without requiring extensive hardware modification.

OBJECT OF THE INVENTION

It is, therefore, the primary object of the present invention to optimize the speed of currently-available CD-ROM drives without incurring serious performance problems or requiring extensive hardware changes.

SUMMARY OF THE INVENTION

The present invention is a system and method for pre-calibrating a CD-ROM drive for each CD-ROM disc inserted into the drive for maximizing the drive's performance without degradation in data transmission. When a CD-ROM disc is inserted, the disc is rotated to its maximum speed. The system reads a predetermined data segment from the inner most region of the disc. If error is detected, then the speed is lowered until no errors are encountered. The error-free speed is then chosen as the operating speed for the disc. In another embodiment, the disc is separated into multiple zones. The system calibrates each of the zones for its particular maximum error-free speed, and selects the error-free speed as the operating speed for the zone.

DETAILED DESCRIPTION OF THE INVENTION

Figure 1:
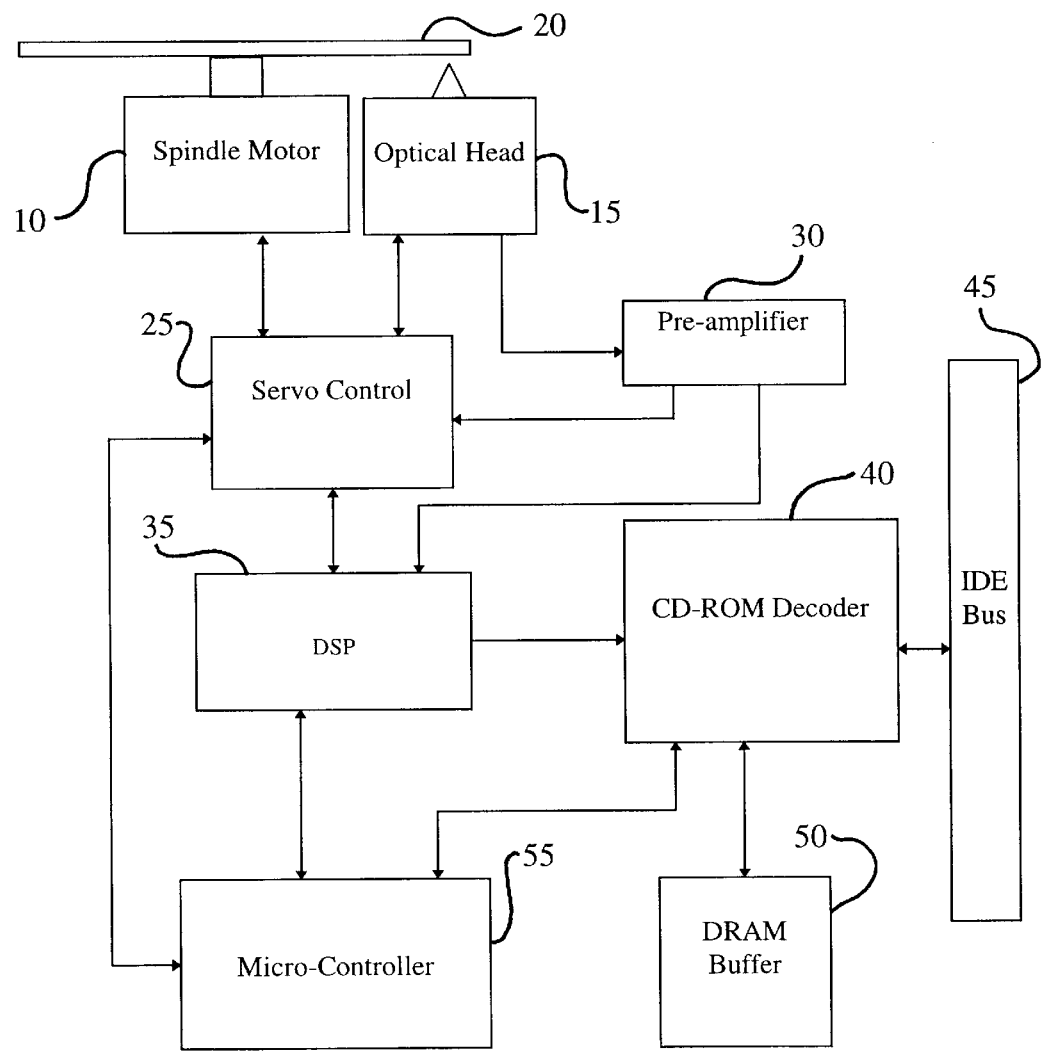
FIG. 1 is a block diagram illustrating the hardware implementation of the present invention.

To fully appreciate the system and methods of the present invention, some discussion of the current CD-ROM technology is warranted. In the current CD-ROM discs, data is uniformly stored in spiral pattern originating from the region closest to the center of the disc, or the inner region. To read the data, the disc is rotated in a CD-ROM drive, and the data is read off the disc in a spiral pattern. The radius of the inner spiral is smaller than outer ones, and so the linear velocity is different for the various regions of the disc, while the angular or rotation velocity remains constant. Because the data on the disc is uniformly spaced along the spiral, the data transmission speed is directly proportional to the linear velocity. Hence, if the angular velocity were to remain constant, the transmission speed would fluctuate widely as a function of the linear velocity. Therefore, the linear velocity must remain constant if the consistent data transmission speed is to be achieved.

Hence, the current CD-ROM drives vary the angular or rotational speed in order to achieve constant linear velocity, or CLV, which in turn determines the data transmission speed. Since the radius is smaller in the inner regions of the disc, the angular velocity must necessarily be greater when reading the data off the inner regions of the disc than when reading the data off the outer portion. Consequently, the spinning rate of the CD-ROM must be at its greatest when reading the data off the inner-most region.

As the rotational speeds increase, the drive may encounter excessive vibration which may cause intermittent data streaming and other data transmission problems. Although these problems can occur at any region of the disc, the inner-most region is more susceptible to vibration-induced errors because the angular speed is greatest when reading data off this region. To ensure that consistent data transmission is achieved for all regions of the disc, the current CD-ROM drives applies a CLV value having a safe corresponding angular speed in the inner-most region.

Because the angular speed in the regions outside of inner region is less than that of the inner region, higher CLV may be used in these regions without incurring vibration-induced or other types of errors. However, the current CD-ROM drives are not designed to utilize varying CLV values for different regions of the disc. Hence, the entire disc must be operated at a CLV value which is safe for the inner region, even though higher CLV values are possible for other regions. The end result is that the overall data transmission speed is lower than what the drive's hardware may be capable of providing.

Furthermore, the CLV value chosen for the inner region is further reduced from its theoretical maximum to account for various other factors such as unevenness of certain CD-ROM discs and poor recording. The current CD-ROM drives have no way of accounting for these factors which may affect the integrity of the data transmission. Hence, the manufacturing specification calls for a reduced amount to cover for all types of situation.

The present invention provides methods for accounting for the factors described above. Each of the methods involves a short calibration process performed before the actual running of the drive to increase the speed of the drive to the highest level it can perform without incurring data transmission problems. Two general methods are offered for optimizing the speed of a CD-ROM drive, a single-zone and a multi-zone approach. In the single-zone approach, only one region or zone, here the inner zone, is calibrated for optimal speed, and hence a single CLV value is used for the entire disc. In the multi-zone approach, several zones are calibrated for optimal speed, and varying CLV values may be used across the different regions of the disc.

FIG. 1 is a block diagram illustrating the elements of the present system. The system utilizes an existing hardware implementation of the current CD-ROM drives which is well known to those skilled in the art. Hence FIG. 1 is presented here only for general illustration purposes, and should not construed as being the only way to implement the system. In FIG. 1, the system includes a spindle motor 10 which rotates the CD-ROM disc 20. The spindle motor 10 is controlled by a servo control 25 which is couple to the spindle motor 10 and an optical head 15 for reading data off the disc 20. A pre-amplifier 30 for amplifying pertinent electrical signals is couple to the optical head 15, the servo control 25, and a digital signal processor (DSP) 35. The system further includes a CD-ROM decoder for decoding the signals received from the DSP 35, and is coupled to a micro-controller 55, a DRAM buffer 50, and an IDE bus 45.

Figure 2:
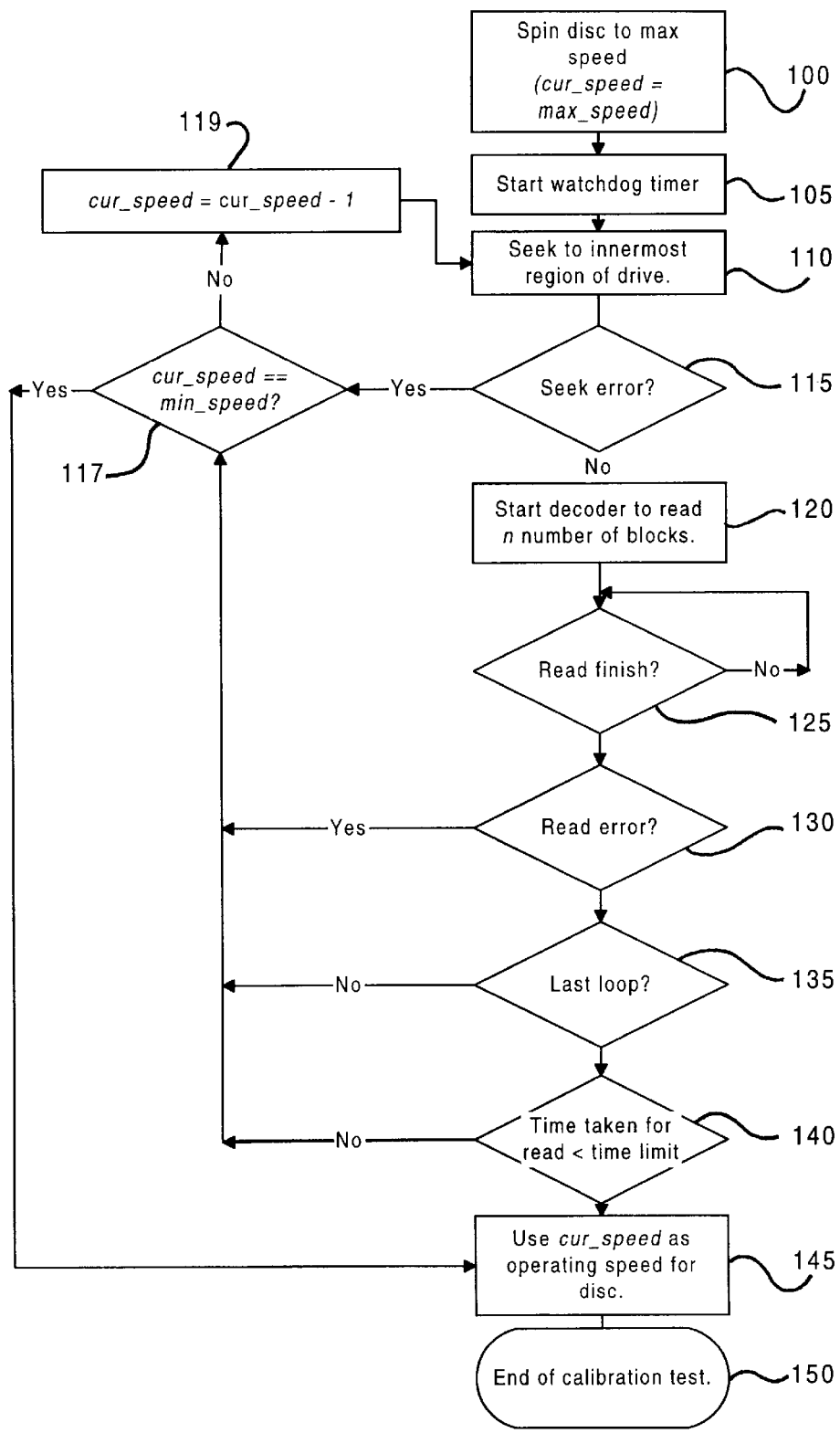
FIG. 2 is a flow diagram of the single-zone method for optimizing a CD-ROM drive.

FIG. 2 is a flow diagram illustrating the single-zone approach for optimizing the speed utilizing the implementation as illustrated in FIG. 1. A CD-ROM disc 20 is first inserted into a CD-ROM drive. In Step 100, the current speed, which is the particular speed at which the disc is made to rotate at a particular point in time, is set at maximum speed so that the disc 20 is made to spin at the maximum rotational speed allowed by the system hardware. A number of hardware constraints may determine the maximum speed, but an important factor will be the maximum load which can be undertaken by the spindle motor 10. Typically, the corresponding data transmission speed will be around 8x, or roughly eight times greater than the transmission speed of an audio CD player. But this maximum speed may be lesser or greater depending on the particular hardware implementation.

After the selected maximum speed is achieved, a timer is set to begin in step 105 to measure the time t to take to read off a predetermined data segment on the disc. In step 110, the optical head 15 seeks out the inner most region of the disc 20 since this is the region where the maximum rotational speed will be encountered. If any errors in seeking the inner region are encountered (called "seek errors"), then the maximum speed is presumed to be too high, and the system moves to step 117. In step 117, the system checks to see whether the current speed is a pre-set minimum speed, which is a fixed speed determined to be reliable from a prior laboratory testing. In the event that the current speed does match the minimum speed, then the current speed (same as minimum speed at this point) is used as the operating speed in step 145, and the calibration process is terminated. If the current speed does not match the minimum speed, then the system lowers the current speed by a fixed increment in step 119, typically by 1x. The system then moves back to step 110 and seeks the inner-most region again until no seek error is encountered.

When no seek error is found in step 115, the system moves to step 120 where it reads a predetermined number of blocks of data off the inner zone. It continually checks to see if the reading is finished in step 125, and if not, then loops back to step 120. After the reading is finished, the system checks for any read error in step 130. If any read error is encountered, then the system moves to step 117 and the instruction set described above for step 117 is performed. If no read error is encountered, then the system checks for the last test cycle. or loop, in step 135. If the last loop is not found, then the system returns to step 117. If the loop is found, the system moves to step 140.

In step 140, the system checks to see whether the time t taken to read is smaller than the pre-set time limit T. The pre-set time T is a fixed value determined experimentally. Since this time will be added to the total time taken for the calibration process, it should be a relatively low value, e.g., 2 seconds. If the time t is less than the time limit T, then the current speed is chosen as the operating speed in step 145, and the calibration process is terminated. However, if the time t exceeds the time limit T, then the system moves to step 117 and performs the above described instruction set.

Figure 3A:
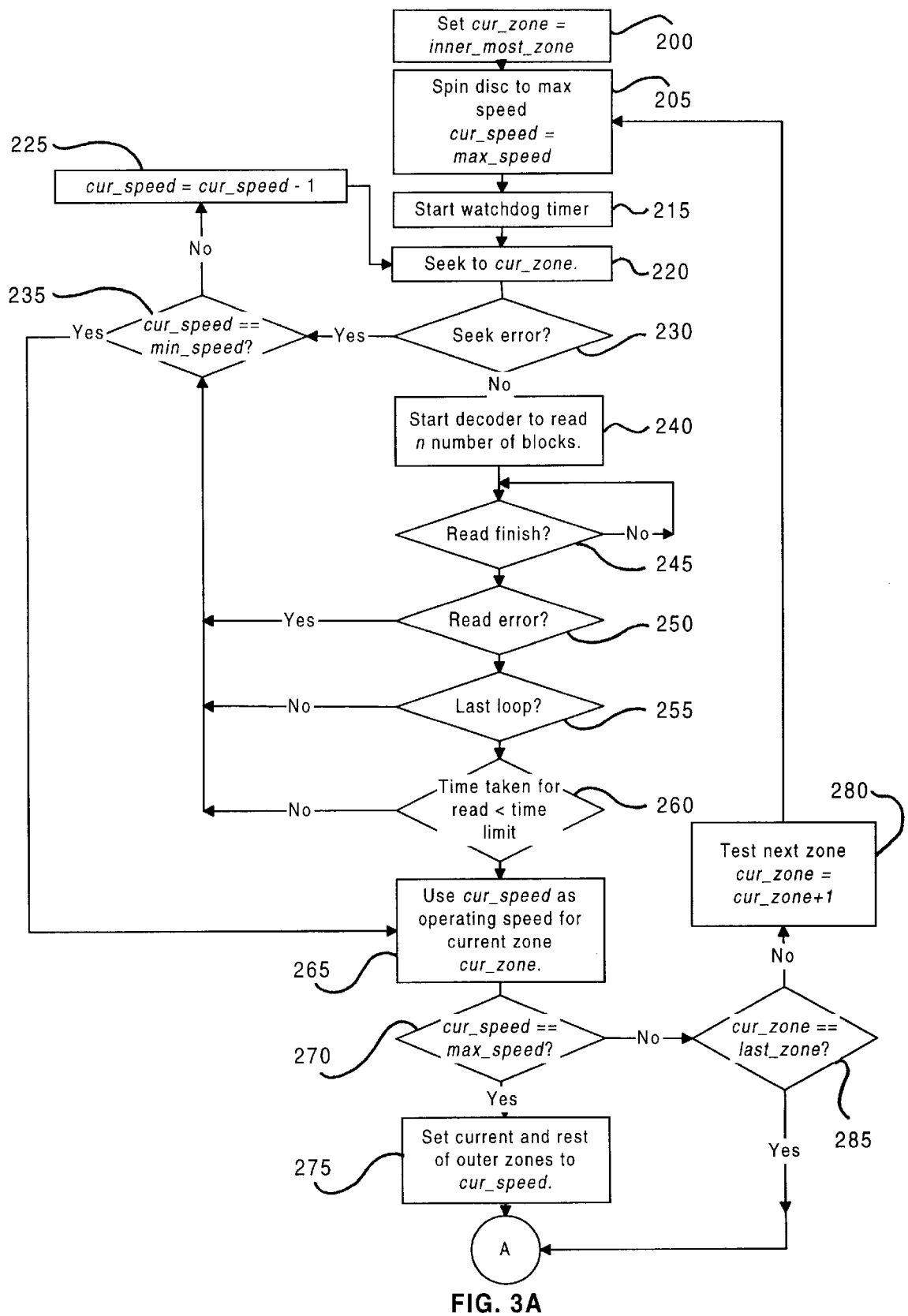
FIGS. 3A and 3B are flow diagrams of the multi-zone method for optimizing a CD-ROM drive.
Figure 3B:
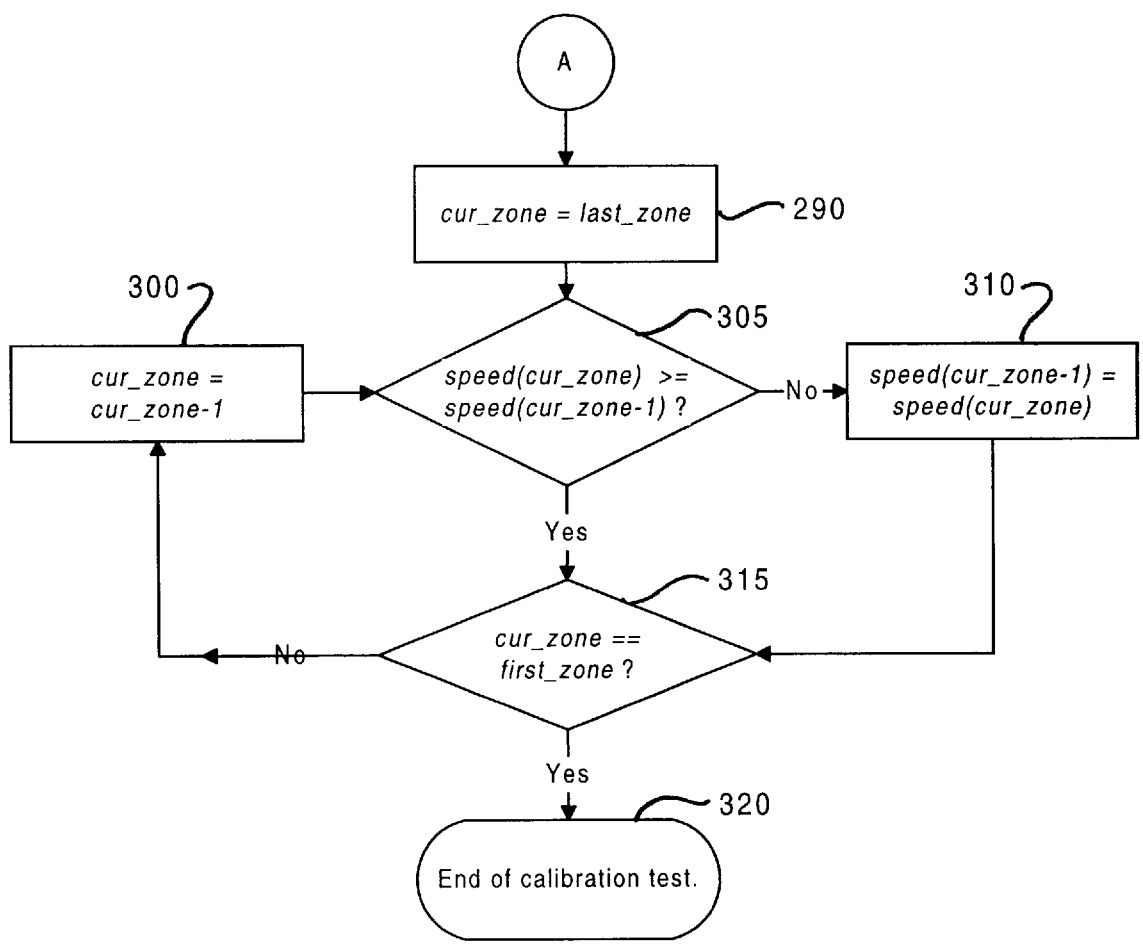

FIG. 3A and FIG. 3B are a flow diagram illustrating the multi-zone approach for optimizing the speed utilizing the implementation as illustrated in FIG. 1 (FIG. 3B is a continuation of FIG. 3A). The multi-zone method has many of the similar steps as in the single-zone approach, but here plurality of zones are selected and calibrated for optimal speed for each of the zones. Though many zones can be used, it is preferred that relatively small number of zones be selected. Otherwise, the calibration process may become undesirable lengthy.

In the preferred embodiment, two zones are used. The first zone covers the data track of 0 to 5 minutes; the second zone covers the data track greater than 5 minutes. However, the number of zones and the zone designation may be changed to suit a particular situation. In some instances, it may be desirable to have greater number of zones spaced at shorter or greater time intervals. However, it should be understood that though an increase in the number of zones may increase the drive speed, it may unduly increase the ready time. Hence, in an alternative embodiment, termed the adaptive zone boundary implementation, the number of zones and their designations are able to be selected by a user to suit various situations.

In FIG. 3A, CD-ROM disc 20 is first inserted into a CD-ROM drive. In step 200, the current zone, which is the particular zone being calibrated at any given point in time, is set to the inner zone. In Step 205, the current speed, which is the particular speed at which the disc is made to rotate for a particular zone or region of the disc, is set at maximum speed so that the disc 20 is made to spin at the maximum rotational speed allowed by the system hardware. A number of hardware constraints may determine the maximum speed, but an important factor will be the maximum load which can be undertaken by the spindle motor 10. Typically, the corresponding data transmission speed will be around 8x, or roughly eight times greater than the transmission speed of an audio CD player. But this maximum speed may be lesser or greater depending on the particular hardware implementation.

After the selected maximum speed is achieved, the timer is set to begin in step 215. In step 220, the optical head 15 seeks out the current zone, which initially is the inner most region of the disc 20 since this is the region where the maximum rotational speed will be encountered. However, in subsequent runs, the current zone may cover regions other than the inner-most region.

If any errors in seeking the current zone are encountered (called "seek errors"), then the maximum speed is presumed to be too high, and the system moves to step 235. In step 235, the system checks to see whether the current speed equals a pre-set minimum speed, which is a fixed speed determined to be reliable from a prior laboratory testing. In the event that the current speed does match the minimum speed, then the current speed (same as minimum speed at this point) is used as the operating speed for the current zone in step 265, and the system moves on to step 270. If the current speed does not match the minimum speed, then the system lowers the current speed by a fixed increment, typically by 1x in step 225, and moves back to step 220 and seeks the current zone again until no seek error is encountered.

In the event that no seek error is found in step 220, the system moves to step 240 where it reads a predetermined number of blocks of data off the current zone. It continually checks to see if the reading in finished in step 245, and if not, then loops back to step 240. After the reading is finished, the system checks for any read error in step 250. If any read error is encountered, then the system moves to step 235 and the instruction set described above for step 235 is performed. If no read error is encountered, then the system checks for the last test cycle or loop in step 255. If the last loop is not found, the system goes back to step 235. If the last loop is found, the system moves to step 260 where it checks to see whether the time t taken to read the data is smaller than the pre-set time limit T. If the time t does not exceed the time limit T, then the current speed is chosen as the operating speed for the current zone in step 265, and the system moves to step 270.

In step 270, the system checks to see if the current speed is the maximum speed. If the current speed is found to be the maximum speed, then the system sets the current and the rest of the zones to the current speed (here the maximum speed) in step 275, and the system moves to step 290 (FIG. 3B). If the current speed is not the maximum speed in step 270, then the system checks to see if the current zone is the last zone in step 285. If the current zone is not the last zone, then the system moves on to the next zone (the zone further away from the inner zone) in step 280 and begins the entire instruction set over again starting from step 205. If in step 285, it is determined that the current zone is the last zone, then the system moves to step 290.

Referring now to FIG. 3B, in step 290, the current zone is set to the last zone and the system moves to step 305. In step 305, the system checks to see if the speed of the current zone is either greater or equal to the speed of the last previous zone (the zone closer to the inner zone). If the condition in step 305 is met, then the system moves to step 310, where the system sets the speed of the previous zone to the speed of the current zone, and moves to step 315. If the condition in step 305 is not met, then the system directly moves to step 315, where the system checks to see if the current zone is the first zone, or in this embodiment, the inner zone. If the condition in step 315 is met, then the system moves to step 320 and terminates the calibration process. If the condition in step 315 is not met, then the system moves to step 300 where the current zone is set to the last previous zone. The system then moves to step 305 and performs the instruction described above for step 305. The steps beginning from step 290 described in this paragraph basically perform the function of ensuring that a zone which is closer to the inner zone does not operate at a speed that is greater than a zone which is further away from the inner zone. Although it is preferred that this instruction set be included in the multi-zone pre-calibration method, it is possible to dispense with these steps without completely losing the effectiveness of the method described herein.

The system for facilitating the single zone and the multi-zone methods described above may be incorporated into a CD-ROM in various ways. For instance, the system may be hard-wired directly into the hardware of a CD-ROM drive. In the alternative, the system may be incorporated as a software application program in a computer if a proper interface exists between the computer and the CD-ROM drive. For the adaptive zone boundary implementation mentioned above, however, it is preferred that the software approach be taken so that an operator of the drive can easily manipulate the zone parameters to suit his or her needs.

It should be understood by those skilled in the art that though the description above used speeds of 1x, 2x, 4x, and 8x to generally illustrate the principles of the present invention, greater or lower speeds are also applicable. For instance, the present invention may optimize a drive operating at 16x, provided that the accompanying hardware implementation allows the drive to satisfactorily perform at 16x.

It should be also appreciated those skilled in the art that the block diagram of FIG. 1 and the flow diagrams of FIGS. 2, 3A, and 3B, have be presented here only to illustrate the preferred embodiment of the present invention and should not be viewed as the only embodiments. Hence various modifications, additions and substitutions are possible for the preferred embodiment without departing from the. scope and spirit of the invention as disclosed in the accompanying claims.

We claim:

1. A multi-zone, pre-calibration method of optimizing data transmission speed of an optical disc drive comprising:
   a) dividing an optical disc into a plurality of zones;
   b) setting current zone to first zone;
   c) setting current speed to maximum speed;
   d) spinning the optical disc at the current speed;
   e) conducting a data-transmission test on the current zone;
   f) setting operating speed as the current speed for the current zone if the data-transmission test is passed;
   g) setting the operating speed as the current speed for the current zone if the data-transmission test is not passed and the current speed is the minimum speed;
   h) setting the current speed to a lower speed if the data-transmission test is not passed and the current speed is not the minimum speed;
   i) repeating steps d) through h) until the operating speed is determined for the current zone;
   j) setting the operating speed to the maximum speed for the current zone and outer zones and terminating the calibration if the current speed is the maximum speed;
   k) terminating the calibration if the current speed is not the maximum speed for the current zone and the current zone is last zone;
   l) setting the current zone to a next zone if the current speed is not the maximum speed and the current zone is not the last zone; and
   m) repeating steps c) through l) until the operating speed for every zone is determined.

2. The multi-zone method of optimizing data transmission speed as recited in claim 1 wherein said first zone is an inner zone.

3. The multi-zone method of optimizing data transmission speed as recited in claim 1 wherein the optical disc is divided into two zones, an inner zone and an outer zone, said inner zone covering a data track of 0 to 5 minutes, and the outer zone covering a data track of greater than 5 minutes.

4. A multi-zone, pre-calibration method of optimizing data transmission speed of an optical disc drive comprising:
   a) dividing an optical disc into a plurality of zones;
   b) setting current zone to first zone;
   c) setting current speed to maximum speed;
   d) spinning the optical disc at the current speed;
   e) conducting a data-transmission test on the current zone;
   f) setting operating speed as the current speed for the current zone if the data-transmission test is passed;
   g) setting the operating speed as the current speed for the current zone if the data-transmission test is not passed and the current speed is the minimum speed;
   h) setting the current speed to a lower speed if the data-transmission test is not passed and the current speed is not the minimum speed;
   i) repeating steps d) through h) until the operating speed is determined for the current zone;
   j) setting the operating speed to the maximum speed for the current zone and outer zones and skipping to n) if the current speed is the maximum speed;
   k) skipping to n) if the current speed is not the maximum speed for the current zone and the current zone is last zone;
   l) setting the current zone to next zone if the current speed is not the maximum speed and the current zone is not the last zone; and
   m) repeating steps c) through l) until the operating speed for the last zone is determined.
   n) setting the current zone to the last zone
   o) terminating the calibration if the operating speed of the current zone is greater than or equal to the operating speed of previous zone and the current zone is the first zone;
   p) setting the operating speed of the previous zone to the operating speed of the current zone and terminating the calibration if the operating speed of the current zone is less than the operating speed of the previous zone and the current zone is the first zone;
   q) setting the current zone to the previous zone if the operating speed of the current zone is greater than or equal to the operating speed of previous zone and the current zone is not the first zone; and
   r) repeating steps o) through r) until the current zone is the first zone.

5. The multi-zone method of optimizing data transmission speed as recited in claim 4 wherein said first zone is an inner zone.

6. The multi-zone method of optimizing data transmission speed as recited in claim 1 or 4 wherein said data-transmission test in step e) includes the following steps:
   a) starting a timer and seeking to the first zone;
   b) skipping to step d) if no seek error is encountered;
   c) terminating the test and declaring a non-pass result for the data-transmission test if a seek error is encountered;
   d) Reading a pre-selected number of blocks of data in the zone;
   e) detecting for read error;
   f) skipping to step h) if no read error is detected;
   g) terminating the test and declaring a non-pass result for the data-transmission test if a read error is found;
   h) looking for last loop;
   i) skipping to step k) if the last loop is detected;
   j) terminating the test and declaring a non-pass result for the data-transmission test if the last loop is not detected;
   k) comparing a time, t, taken to complete step d) against a pre-selected time limit, T;
   l) terminating the test and declaring a non-pass result for the data-transmission test if t is greater or equal to T; and
   m) terminating the test and declaring a pass result for the test if t is less than T.

7. A single-zone, pre-calibration method of optimizing data transmission speed of an optical disc drive comprising:
   a) setting current speed to maximum speed;
   b) spinning an optical disc at the current speed;
   c) conducting a data-transmission test on a zone, said data-transmission test comprising,
      1) starting a timer and seeking to said zone;
      2) skipping to step 4) if no seek error is encountered;

3) terminating the test and declaring a non-pass result for the data-transmission test if a seek error is encountered;
4) Reading a pre-selected number of blocks of data in the zone;
5) detecting for read error;
6) skipping to step 8) if no read error is detected;
7) terminating the test and declaring a non-pass result for the data-transmission test if a read error is detected;
8) looking for a last loop;
9) skipping to step 11) if the last loop is detected;
10) terminating the test and declaring a non-pass result for the data-transmission test if the last loop is not detected;
11) comparing a time, t, taken to complete step 4) against a pre-selected time limit, T;
12) terminating the test and declaring a non-pass result for the data-transmission test if t is greater or equal to T; and
13) terminating the test and declaring a pass result for the test if t is less than T.

d) setting operating speed to the current speed if the data-transmission test is passed;
e) setting the operating speed to the current speed if the data-transmission test is not passed and the current speed is minimum speed;
f) setting current speed to a lower speed if the data-transmission test is not passed and the current speed is not the minimum speed; and
g) repeating steps b) through f) until the operating speed is determined.

8. The method of optimizing data transmission speed as recited in claim 4 wherein said zone is an inner zone covering a data track of 0 to 5 minutes.

9. A single-zone pre-calibrating system for optimizing data transmission speed of an optical disc drive, said system comprising;
   a) a control means for precisely varying a rotational speed of an optical disc disposed in the optical disc drive;
   b) a reading means for reading data off the optical disc at any precisely selected region of the disc;
   c) an error detecting means for detecting seek error and read error;
   d) a timer for measuring amount of time taken to read the data in the selected region;
   e) a micro-controller adapted for analyzing and controlling said control means, said reading means, said error detecting means, and said timer;
   whereby said micro-controller selects an optimum rotational speed for the optical disc drive for each optical disc inserted into the drive by having said reading means seek and read data off a region of the disc at different rotational speeds as controlled by said control means, said micro-controller selecting a highest speed not taking more than a pre-selected time limit to read the data as measured by said timer, and not yielding a seek error or read error from said error-detecting means, said highest speed being selected by said micro-controller as an operating speed for the drive.

10. A single-zone pre-calibrating system as recited in claim 6 wherein an inner-most region of said optical disc is selected by said micro-controller as a zone to be tested.

11. A multi-zone pre-calibrating system for optimizing data transmission speed of an optical disc drive, said system comprising:
   a) a control means for precisely varying rotational speed of an optical disc drive disposed in the optical disc drive,
   b) a reading means for reading data off the CD-ROM disc at any precisely selected region of the disc;
   c) an error detecting means for detecting seek error and read error;
   d) a timer for measuring amount of time taken to read the selected region;
   e) a micro-controller adapted for analyzing and controlling said control means, said reading means, said error detecting means, and said timer;
   whereby said micro-controller divides the optical disc into a plurality of zones and selects an optimum rotational speed for the optical disc drive for each optical disc inserted into the drive for each of the zones by having said reading means seek and read data off each zone of the disc at different rotational speeds as controlled by said control means, said micro-controller selecting a highest speed not taking more than a pre-selected time limit to read the data as measured by said timer, and not yielding a seek error or read error from said error-detecting means, said highest speed being selected by said micro-controller as an operating speed for the drive.

12. The system as recited in claim 11 wherein said micro-controller divides the optical disc into two zones, an inner zone and an outer zone, said inner zone covering the data track of 0 to 5 minutes, and the outer zone covering the data track of greater than 5 minutes.

13. The system as recited in claim 12 further comprising a means for allowing a user of the optical disc drive to select a number of zones and to designate zone boundaries.

* * * * *